United States Patent
Samie et al.

(10) Patent No.: US 10,710,449 B2
(45) Date of Patent: Jul. 14, 2020

(54) HYBRID DRIVETRAIN

(71) Applicant: GM GLOBAL TECHNOLOGY OPERATIONS LLC, Detroit, MI (US)

(72) Inventors: Farzad Samie, Franklin, MI (US); Derek F. Lahr, Howell, MI (US); Peter Beller, West Bloomfield, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 970 days.

(21) Appl. No.: 15/211,681

(22) Filed: Jul. 15, 2016

(65) Prior Publication Data
US 2018/0015817 A1    Jan. 18, 2018

(51) Int. Cl.
*B60K 6/50* (2007.10)
*B60K 6/30* (2007.10)
*B60K 6/48* (2007.10)
*B60K 6/36* (2007.10)
*B60K 6/387* (2007.10)
(Continued)

(52) U.S. Cl.
CPC ............ *B60K 6/50* (2013.01); *B60K 6/30* (2013.01); *B60K 6/36* (2013.01); *B60K 6/387* (2013.01); *B60K 6/48* (2013.01); *F16H 57/0457* (2013.01); *B60K 2006/4825* (2013.01); *B60Y 2200/92* (2013.01); *B60Y 2400/424* (2013.01); *B60Y 2400/426* (2013.01); *B60Y 2400/70* (2013.01); *F16H 47/065* (2013.01); *Y02T 10/6221* (2013.01); *Y02T 10/6252* (2013.01);
(Continued)

(58) Field of Classification Search
CPC ... B60K 6/30; B60K 6/36; B60K 6/48; B60K 6/50; B60K 6/387; F16H 57/0457
USPC .................................................. 74/661, 720
See application file for complete search history.

(56) References Cited

U.S. PATENT DOCUMENTS

| 4,462,269 | A | * | 7/1984 | Inglis | ................. | F16F 15/1315 |
| | | | | | | 123/185.1 |
| 2013/0196817 | A1 | * | 8/2013 | Miyazaki | ................. | B60K 6/26 |
| | | | | | | 477/5 |

(Continued)

FOREIGN PATENT DOCUMENTS

| CN | 101143558 A | 3/2008 |
| DE | 4007424 A1 | 10/1990 |

(Continued)

*Primary Examiner* — William C Joyce
(74) *Attorney, Agent, or Firm* — Quinn IP Law

(57) ABSTRACT

A geartrain for a powertrain system is disposed to transfer mechanical power between an internal combustion engine, an electric machine and a driveline. The geartrain includes a flywheel, a torque converter, an off-axis mechanical connection and a transmission gearbox. The off-axis mechanical connection includes a first element rotatably coupled to a second element. The flywheel is coupled to a crankshaft of the internal combustion engine. The torque converter includes a pump, a turbine and a pump hub, and the transmission gearbox includes an input member. The pump of the torque converter is coupled to the flywheel, and the pump hub is coupled to the first element of the off-axis mechanical connection. The second element of the off-axis mechanical connection is coupled to a rotor of the electric machine, and the turbine of the torque converter is coupled to the input member of the transmission gearbox.

18 Claims, 4 Drawing Sheets

(51) Int. Cl.
*F16H 57/04* (2010.01)
*F16H 47/06* (2006.01)

(52) U.S. Cl.
CPC ........ *Y10S 903/909* (2013.01); *Y10S 903/914* (2013.01); *Y10S 903/915* (2013.01)

(56) References Cited

U.S. PATENT DOCUMENTS

2013/0277163 A1* 10/2013 Ideshio .................. F16H 45/02
192/3.28
2015/0211617 A1* 7/2015 Yang .................. F16H 37/0806
74/661

FOREIGN PATENT DOCUMENTS

| | | | |
|---|---|---|---|
| DE | 42 25 315 | * | 2/1994 |
| EP | 2990249 A2 | | 3/2016 |
| JP | 2003048460 A | | 2/2003 |
| JP | 2007-22112 | * | 2/2007 |

* cited by examiner

HYBRID DRIVETRAIN

TECHNICAL FIELD

The present disclosure relates to hybrid drivetrains for vehicles.

BACKGROUND

Known hybrid drivetrain systems include internal combustion engines and electric motor/generators that are coupled to transmissions to transfer torque to a driveline for tractive effort. Known electric motor/generators are supplied electric power from energy storage systems. Powertrain systems for hybrid drivetrains may operate in various modes to generate and transfer propulsion power to vehicle wheels.

SUMMARY

A geartrain for a powertrain system is described, and is disposed to transfer mechanical power between an internal combustion engine, an electric machine and a driveline. The geartrain includes a flywheel, a torque converter, an off-axis mechanical connection and a transmission gearbox. The off-axis mechanical connection includes a gearset that is disposed within a housing of the geartrain and includes a first element rotatably coupled to a second element. The flywheel is coupled to a crankshaft of the internal combustion engine. The torque converter includes a pump, a turbine and a pump hub, and the transmission gearbox includes an input member. The pump of the torque converter is coupled to the flywheel, and the pump hub is coupled to the first element of the off-axis mechanical connection. The second element of the off-axis mechanical connection is coupled to a rotor of the electric machine, and the turbine of the torque converter is coupled to the input member of the transmission gearbox.

The above features and advantages, and other features and advantages of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 schematically illustrates a cut-away end-view of the geartrain of FIG. 2, including a first embodiment of the off-axis mechanical connection in the form of a chain and sprocket connection, in accordance with the disclosure; and FIG. 3-2 schematically illustrates a cut-away end-view of the geartrain of FIG. 2, including a second embodiment of the off-axis mechanical connection in the form of a spur gearset connection, in accordance with the disclosure.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
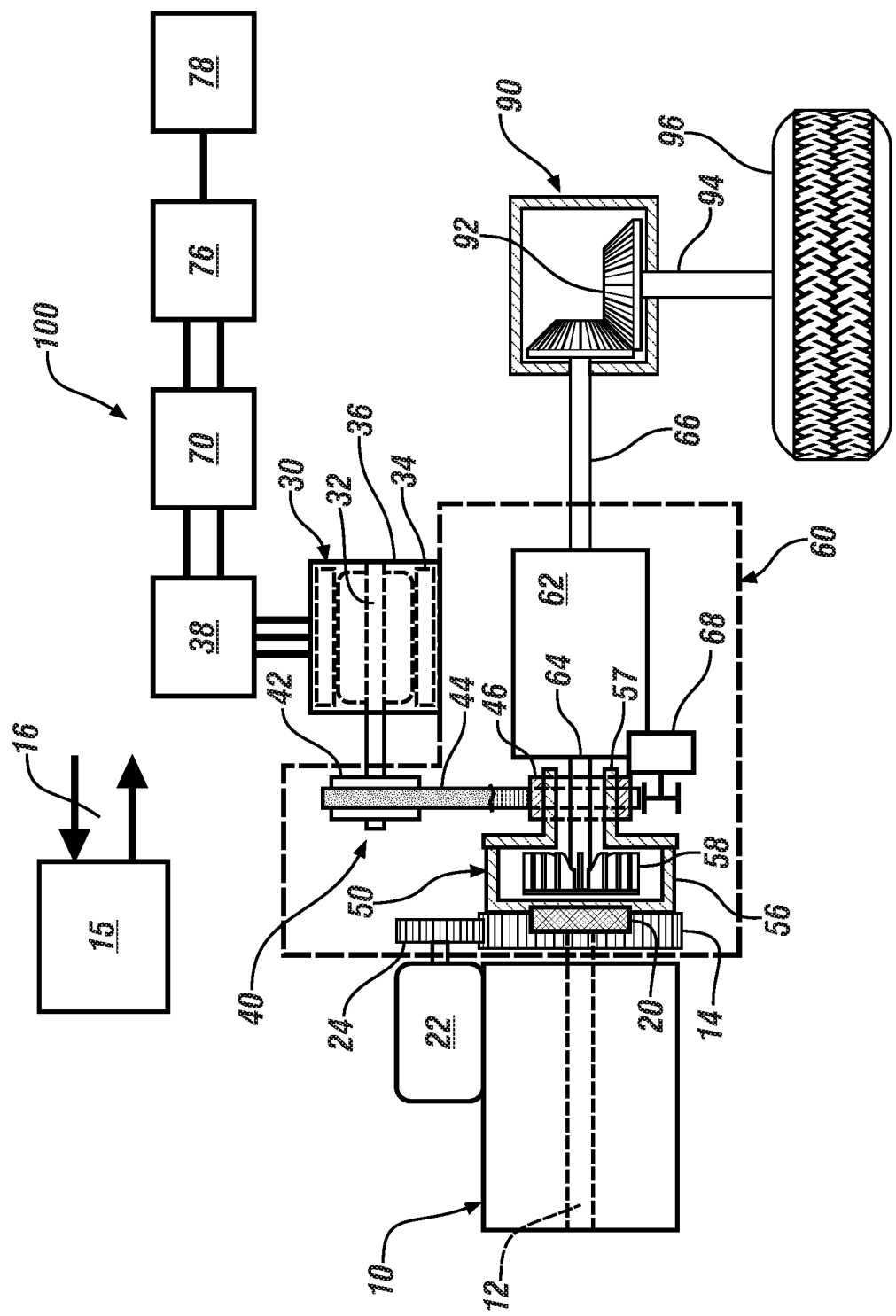
FIG. 1 schematically illustrates a drivetrain system that includes an internal combustion engine and an electric machine that are coupled to a geartrain, wherein the electric machine is coupled to the geartrain via an off-axis mechanical connection and wherein the geartrain is coupled to a driveline, in accordance with the disclosure.

Referring now to FIG. 1, a hybrid drivetrain system 100 is schematically shown, and includes multiple torque-generating devices including an internal combustion engine (engine) 10 and at least one electrically-powered torque machine (electric machine) 30. The engine 10 and electric machine 30 are mechanically coupled to a geartrain 60, and the geartrain 60 is mechanically coupled to a driveline 90. The geartrain 60 preferably includes a flywheel 14, a torque converter 50, an off-axis mechanical connection 40 and a transmission gearbox 62. The driveline 90 preferably includes a differential gearset 92 that is coupled to at least one driveshaft member 94 that is coupled to a corresponding vehicle wheel 96. The electric machine 30 is mechanically coupled to the geartrain 60 via the off-axis mechanical connection 40. The concepts described herein may apply to any suitable configuration that includes an embodiment of the geartrain 60 that is disposed to transfer propulsion power between the internal combustion engine 10, the electric machine 30 and the driveline 90. Like numerals refer to like elements throughout the description. Operation of the drivetrain system 100 may be controlled by a controller 15, which is shown as a unitary device for ease of illustration. The drivetrain system 100 may be advantageously employed on a vehicle to provide propulsion power. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

Figure 4:
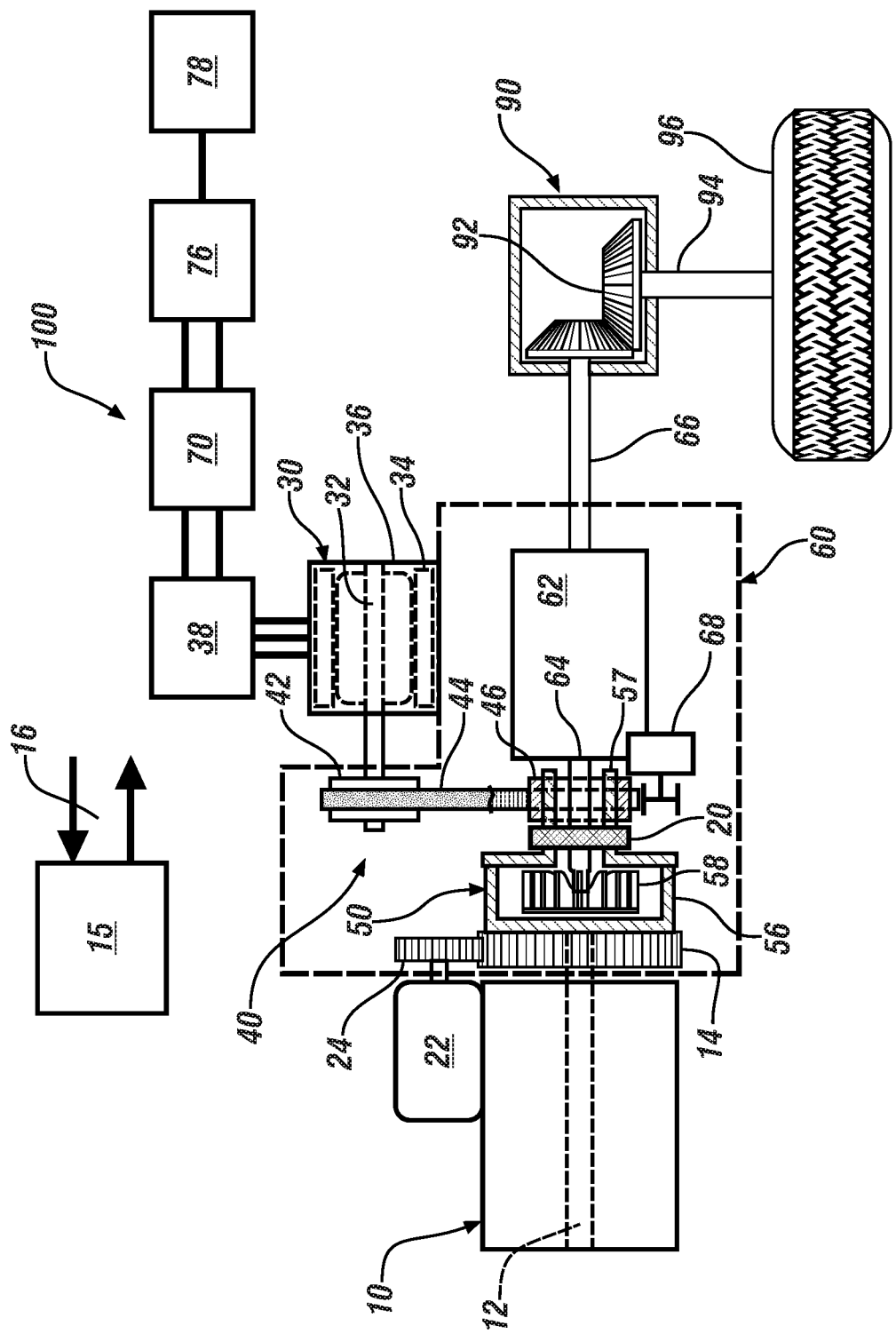
FIG. 4 schematically illustrates another embodiment of a drivetrain system that includes an internal combustion engine and an electric machine that are coupled to a geartrain, wherein the electric machine is coupled to the geartrain via an off-axis mechanical connection and wherein the geartrain is coupled to a driveline, in accordance with the disclosure.

The engine 10 includes a crankshaft 12 that has an output portion that mechanically couples to a flywheel 14, which is coupled via a disconnect clutch 20 to a pump 56 of the torque converter 50. The disconnect clutch 20 may be integrated into the housing of the torque converter 50, thus facilitating powertrain operation in a regenerative braking mode and coasting, facilitating operation in the electric-only drive mode, and enhancing off-throttle sailing. This also facilitates starting of the engine 10 without spinning the pump 56 of the torque converter 50. In one embodiment (as shown), the disconnect clutch 20 is configured to couple the flywheel 14 to the pump 56 of the torque converter 50 when activated. Alternatively, as shown with reference to FIG. 4 the disconnect clutch 20 may be configured to couple between the pump 56 and a pump hub 57 before a second rotating member 46 of an off-axis mechanical connection 40 when activated.

The engine 10 is preferably configured as a multi-cylinder internal combustion engine that converts fuel to mechanical torque through a thermodynamic combustion process. The engine 10 is equipped with a plurality of actuators and sensing devices for monitoring operation and delivering fuel to form in-cylinder combustion charges that generate an expansion force onto pistons, with such force transferred to the crankshaft 12 to produce torque. The engine 10 preferably includes a starter 22 that includes a starter switch and a starter gear 24, wherein the starter gear 24 meshingly engages gear teeth that are disposed on an outer circumference of the flywheel 14 that is coupled to the crankshaft 12 in one embodiment. The starter 22 is preferably configured as a single-phase electric motor including an output shaft that couples to the starter gear 24, wherein the single-phase electric motor is electrically connected to the low-voltage battery 78 via activation of the starter switch. Alternatively, the starter 22 may be configured as a brushless motor that electrically connects to one leg of a high-voltage bus. In one embodiment, the starter gear 24 is permanently meshingly engaged with the flywheel 14. The flywheel 14 also couples via the disconnect clutch 20 to the pump portion 56 of the torque converter 50 in one embodiment. In one embodiment, the disconnect clutch 20 is a selectable mechanical diode, such as a one-way clutch or a selectable one-way clutch. In one embodiment, the starter 22 is omitted, and the starting function is provided by the electric machine 30. The actuators of the engine 10, including the starter switch of the starter 22 are preferably controlled by an engine controller.

The off-axis mechanical connection 40 preferably includes a first rotating member 42 that rotatably couples to a second rotating member 46, wherein the first rotating member 42 is coupled to the electric machine 30 and the second rotating member 46 is coupled to the pump portion 56 of the torque converter 50. The first rotating member 42 rotatably couples to the second rotating member 46 via a chain and sprocket configuration, a meshing gearset configuration, a belt and pulley configuration or another suitable mechanical configuration. The gear ratio or speed ratio between the first and second rotating members 42, 46 may be any suitable ratio, including either an underdrive ratio or an overdrive ratio, depending upon the relative power output capacities of the electric machine 30 and the engine 10, and other factors. Preferably, the off-axis mechanical connection 40 is disposed within first and second housing portions 52, 54, respectively, of the geartrain 60, thus permitting a portion thereof to be immersed in lubricating fluid (not shown). Embodiments of the off-axis mechanical connection 40 are depicted with reference to FIG. 2 and FIGS. 3-1 and 3-2.

The engine 10 is preferably mechanized with suitable hardware and the engine controller preferably includes suitable control routines to execute autostart and autostop functions, fueled and fuel cutoff (FCO) functions, and all-cylinder and cylinder deactivation functions during ongoing operation of the drivetrain system 100. The engine 10 is considered to be in an OFF state when it is not rotating. The engine 10 is considered to be in an ON state when it is rotating. The all-cylinder state includes engine operation wherein all of the engine cylinders are activated by being fueled and fired. The cylinder deactivation state includes engine operation wherein one or a plurality of the engine cylinders are deactivated by being unfueled and unfired, and preferably operating with engine exhaust valves in open states to minimize pumping losses, while the remaining cylinders are fueled and fired and thus producing torque. The ON state may include the FCO state in which the engine 10 is spinning and unfueled. The ON state may include the cylinder deactivation state. The ON state may include the FCO state in combination with the cylinder deactivation state. Engine mechanizations and control routines for executing autostart, autostop, FCO and cylinder deactivation control routines are known and not described herein. Engine operation may be described in context of engine states, including an engine operation state, an engine fueling state and an engine cylinder state. The engine operation states preferably include the ON and the OFF state. The engine fueling states include the fueled state and the FCO state. The engine cylinder states include the all-cylinder state and the cylinder deactivation state.

The electric machine 30 is preferably a multi-phase electric motor/generator configured to convert stored electric energy to mechanical power and convert mechanical power to electric energy that may be stored in a DC power source 70. The DC power source 70 may be configured at a nominal 48 volt DC voltage level in one embodiment. Alternatively, the DC power source 70 may be configured at a nominal 300 volt DC voltage level, or another suitable voltage level, as may be selected. The electric machine 30 preferably includes a rotor 32 and a stator 34, and electrically connects via an inverter module 38 to the DC power source 70. The rotor 32 couples to the first rotating member 42 of the off-axis mechanical connection 40. Alternatively, another non-combustion torque machine, such as a pneumatically-powered device or a hydraulically-powered device may be employed in place of the electric machine 30. By way of definition, a non-combustion torque machine is any device capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are known and not described in detail herein.

The torque converter 50 is a rotatable torque coupling device arranged between an input member of the engine 10 and an input member 64 of the transmission gearbox 62. The torque converter 50 preferably includes a pump 56 rotatably coupled to the crankshaft 12, a stator element (not shown), a turbine 58 that is rotatably coupled to the input member 64 to the transmission gearbox 62 and a controllable clutch (not shown). The pump 56 includes a pump hub 57 that includes a second rotating member 46 of the off-axis mechanical connection 40. The torque converter 50 operates to provide fluid torque coupling between the pump 56 and the turbine 58 when the torque converter clutch is deactivated or released, and provides mechanical torque coupling between the pump 56 and the turbine 58 when the torque converter clutch is activated. One skilled in the art understands details related to the design and operation of the torque converter 50.

The transmission gearbox 62 may be arranged in a step-gear configuration in one embodiment, and may include one or more differential gearsets and activatable clutches configured to effect torque transfer in one of a plurality of fixed gear states over a range of speed ratios between the engine 10, the input member 64 and the output member 66. A hydraulic pump 68 is configured to supply pressurized hydraulic fluid to the transmission gearbox 62, and is rotatably coupled to the pump hub 57. Alternatively, the transmission gearbox 62 may be configured as a manual transmission, a continuously-variable transmission or CVT device, a dual-clutch transmission or DCT device, or another suitable arrangement. When the transmission gearbox 62 is configured as a manual transmission, the second rotating member 46 of the off-axis mechanical connection 40 may be coupled directly to the flywheel 14 outside of the housing 50, preferably without an intervening torque converter (not shown). In such an embodiment, the manual transmission gearbox includes a user clutch and an input member. The first element 42 of the off-axis mechanical connection 40 is coupled to the flywheel 14, and is also connected to the input member of the manual transmission via the user clutch, when applied. The second element 46 of the off-axis mechanical connection is coupled to the rotor 32 of the electric machine 30 (not shown).

The transmission gearbox 62 may include a first rotational speed sensor in the form of a Hall-effect sensor or another suitable sensor that may be configured to monitor rotational speed of the input member 64 and/or a second rotational speed sensor that may be configured to monitor rotational speed of the output member 66. The transmission gearbox 62 includes any suitable configuration, and may be an automatic transmission that automatically shifts between the fixed gear states to operate at a gear ratio that achieves a preferred match between an output torque request and an engine operating point. The transmission gearbox 62 automatically executes upshifts to shift to a gear state having a lower numerical multiplication ratio (gear ratio) at preset speed/load points and executes downshifts to shift to a gear state having a higher numerical multiplication ratio at preset speed/load points. The transmission gearbox 62 may be controlled using a controllable hydraulic circuit that communicates with a transmission controller, which may be integrated into or separate from the controller 15. The transmission controller preferably controls the torque converter clutch. The transmission gearbox 62 executes upshifts to shift to a fixed gear that has a lower numerical multiplication ratio (gear ratio) and executes downshifts to shift to a fixed gear that has a higher numerical multiplication ratio. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state. Designs of transmissions and transmission shifting are known and not described in detail herein. Transmission operation may be described in context of a control variable that may be communicated to the transmission gearbox 62 that is related to a selected fixed gear state. The output member 66 of the transmission gearbox 62 is rotatably coupled to an input member of the differential gearset 92 either directly, or via a chain drive mechanism, a meshed gearset, or another suitable torque transmission configuration.

The driveline 90 is disposed to transfer propulsion power between the transmission gearbox 62 and the vehicle wheel 96 via a driveshaft member 94, which is coupled to the differential gearset 92. The driveline 90 may be disposed in either a front-wheel drive configuration, a rear-wheel drive configuration (as shown) or an all-wheel drive configuration. The driveline 90 is configured to transfer tractive power between the output member 66 of the transmission gearbox 62, the electric machine 30 and a road surface via the wheel 96. The driveline 90 is illustrative, and the concepts described herein apply to other drivetrain systems that are similarly configured.

The inverter module 38 is preferably configured with an MGU controller and suitable control circuits including power transistors, e.g., integrated gate bipolar transistors (IGBTs) for transforming DC electric power to AC electric power and transforming AC electric power to DC electric power. The inverter module 38 preferably employs pulsewidth-modulating (PWM) control of the IGBTs to convert stored DC electric power originating in the DC power source 70 to AC electric power to drive the electric machine 30 to generate torque. Similarly, the inverter module 38 converts mechanical power transferred to the electric machine 30 to DC electric power to generate electric energy that is storable in the DC power source 70, including as part of a regenerative braking control strategy. The MGU controller of the inverter module 38 receives motor control commands from the controller 15 and controls inverter states to provide a desired motor drive operation or a regenerative braking operation. In one embodiment, an auxiliary DC/DC electric power converter 76 electrically connects via a high-voltage bus to the DC power source 70, and provides electric power to charge the low-voltage battery 78 via a low-voltage bus. Such electric power connections are known and not described in detail. The low-voltage battery 78 provides low-voltage electric power to low-voltage systems on the drivetrain system 100 and the vehicle, including, e.g., the starter 22, electric windows, HVAC fans, seats, and other devices. In one embodiment the low-voltage battery 78 is configured to operate at a nominal 12 VDC voltage level.

The DC power source 70 is preferably disposed to supply electric power at any suitable voltage level, and may be any DC power source, e.g., a multi-cell lithium ion device, an ultra-capacitor, or another suitable device without limitation. Monitored parameters related to the DC power source 70 preferably include a state of charge (SOC), temperature, and others. In one embodiment, the DC power source 70 may electrically connect via an on-vehicle battery charger to a remote, off-vehicle electric power source for charging while the vehicle is stationary.

The controller 15 may signally connect to an operator interface (not shown), and operates to provide hierarchical control of a plurality of control devices to effect operational control of individual elements of the drivetrain system 100, including, e.g., the inverter module 38, the engine controller and the transmission controller. The controller 15 communicates with each of the inverter module 38, the engine controller and the transmission controller, either directly or via a communications bus 16 to monitor operation and control operations thereof. The terms controller, control module, module, control, control unit, processor and similar terms refer to any one or various combinations of Application Specific Integrated Circuit(s) (ASIC), electronic circuit (s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

Vehicle operation responsive to operator requests includes operating modes of acceleration, braking, steady-state running, coasting, and idling. The acceleration mode includes an operator request to increase vehicle speed. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold speed and the operator request to the accelerator pedal is at a point that is less than required to maintain the present vehicle speed. The idle mode includes vehicle operation wherein vehicle speed is at or near zero.

The drivetrain system 100 is operative in one of a plurality of modes, which may be selected and implemented during ongoing drivetrain operation to effect vehicle operations of acceleration, braking, steady-state running, coasting, and idling. The drivetrain modes include the engine-only drive mode, an electric-only drive mode, a regenerative mode, and an engine/electric-assist drive mode, with accompanying engine autostart/autostop operations. In the engine-only drive mode, the engine 10 is controlled to generate propulsion power while the electric machine 30 freewheels. This mode may be commanded during vehicle acceleration or steady-state operation, or when SOC of the DC power source 70 is greater than a maximum level. In the electric-only drive mode, the electric machine 30 is controlled as a motor to generate propulsion power, while the engine 10 is in the OFF state and disconnected by action of the disconnect clutch 20. This mode may be commanded during idle, vehicle acceleration or steady-state running. In the regenerative mode, the electric machine 30 is controlled as a generator to react driveline torque and generate electric power, while the engine 10 either at idle or is in the OFF state and disconnected by action of the disconnect clutch 20. This mode may be commanded during coasting and vehicle braking. In the engine/electric-assist drive mode, the engine 10 and the electric machine 30 are controlled to generate propulsion power. This mode may be commanded during vehicle acceleration or steady-state running.

Figure 2:
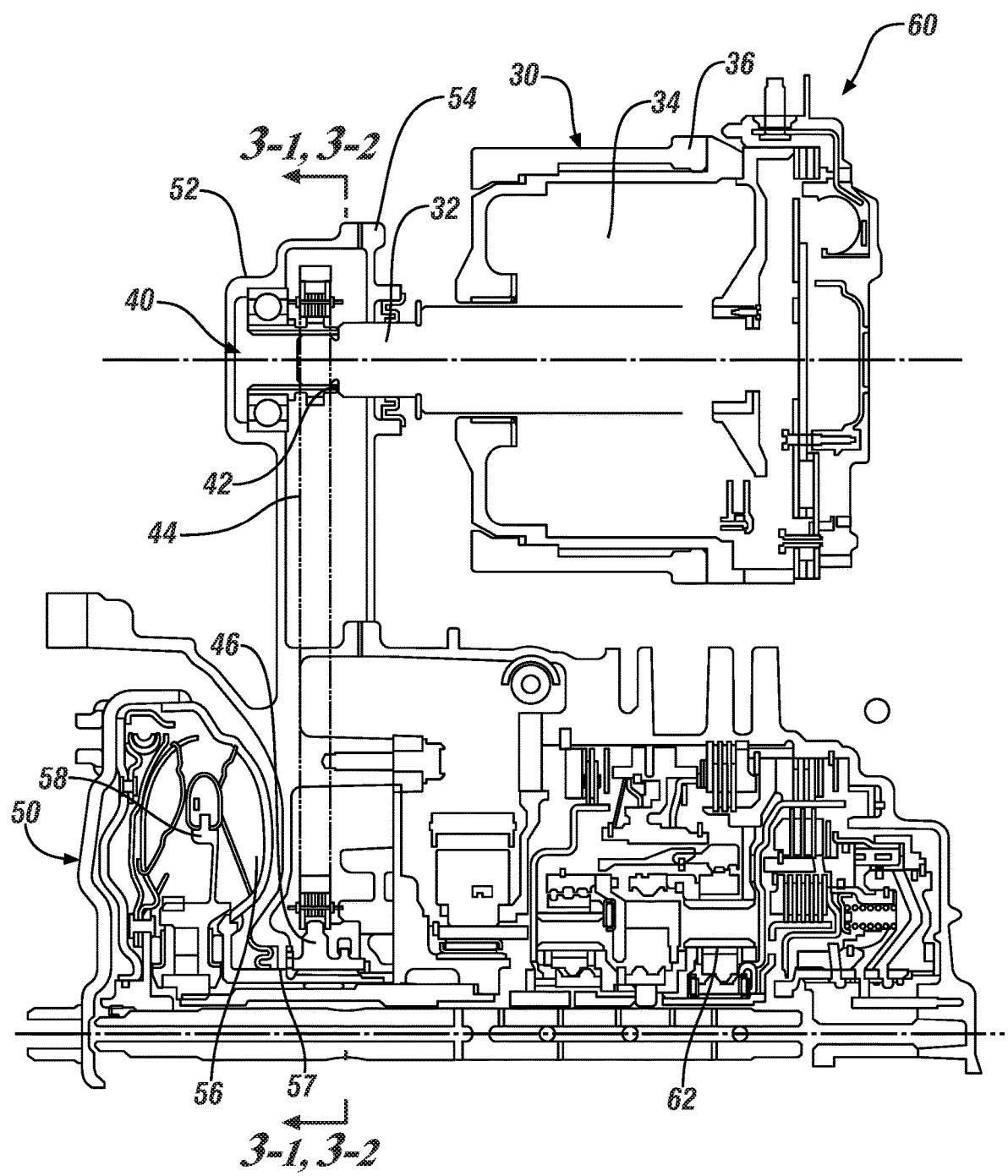
FIG. 2 schematically illustrates a cut-away side-view of a portion of an embodiment of the drivetrain system described with reference to FIG. 1, including the electric machine coupled to the geartrain via an off-axis mechanical connection, in accordance with the disclosure.
Figures 1, 3:
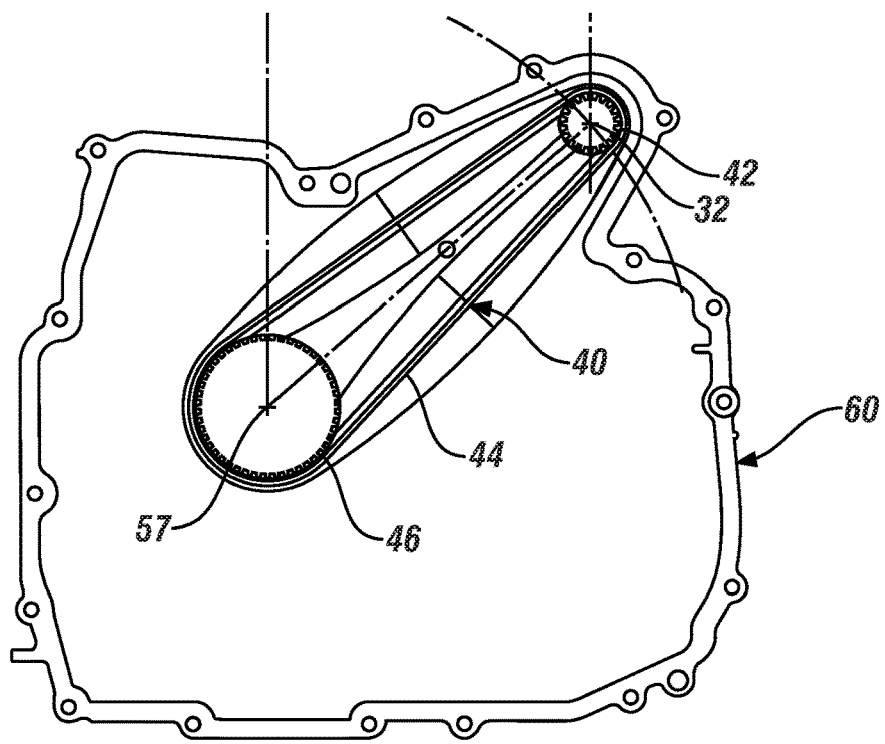
Figures 2, 3:
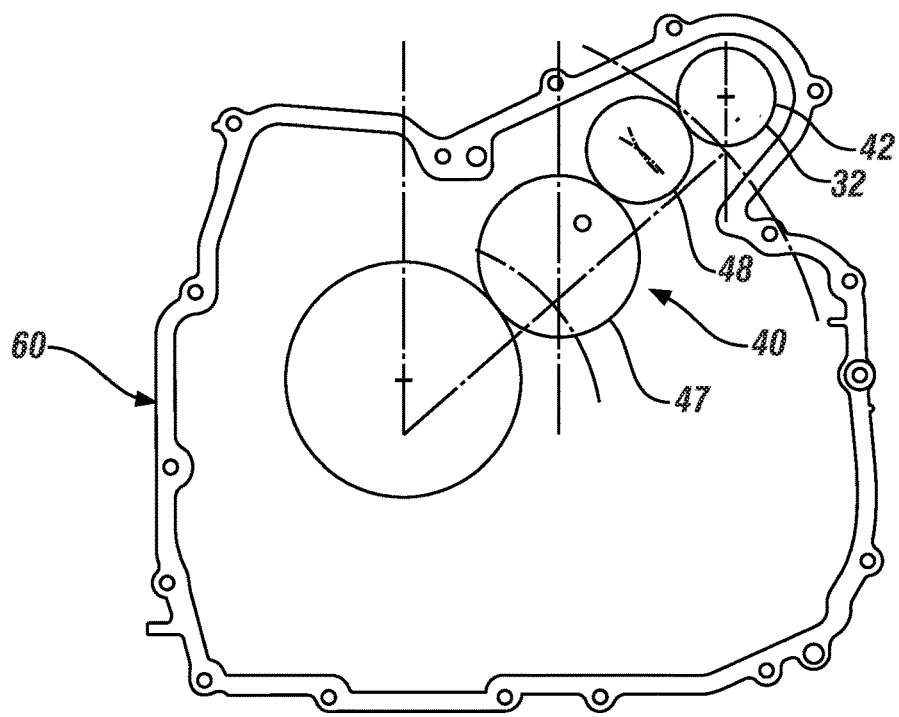

FIG. 2 schematically illustrates a cut-away side-view of a portion of the geartrain 60 that is mechanically coupled to the electric machine 30 via the off-axis mechanical connection 40. Illustrated elements of the electric machine 30 include the rotor 32, stator 34 and housing 36. Illustrated elements of the geartrain 60 include the torque converter 50, which is disposed within the first housing portion 52, the off-axis mechanical connection 40, and the transmission gearbox 62, which is disposed within the second housing portion 54. Illustrated elements of the torque converter 50 include the pump 56, pump hub 57 and turbine 58. Illustrated elements of the off-axis mechanical connection 40 include the first rotating member 42 and the second rotating member 46, wherein the first rotating member 42 is coupled to the rotor 32 of the electric machine 30 and the second rotating member 46 is coupled to the pump hub 57 of the torque converter 50. Cutaway endviews 3-1 and 3-2 are indicated.

The cutaway endview 3-1 of the geartrain 60 of FIG. 2 is a first embodiment of the off-axis mechanical connection 40. This embodiment of the off-axis mechanical connection 40 is preferably in the form of a chain and sprocket connection. In this embodiment, the first rotating member 42 is a toothed gear that is coupled to the rotor 32 of the electric machine 30, and the second rotating member 46 is a toothed gear that is coupled to the pump hub 57 of the torque converter 50. A continuous chain 44 is disposed to couple rotation of the first and second rotating members 42, 46. Suitable tensioners, idler gears and the like may also be disposed therein. The first and second rotating members 42, 46 may be designed to have a suitable gear ratio that permits a coupling that may be selected based upon torque, speed and power capabilities of the engine 10 and the electric machine 30. Alternatively, the first and second rotating members 42, 46 may include two pulleys of suitable diameters to achieve a selected speed ratio, and the continuous chain 44 may be in the form a continuous flexible belt.

The cutaway endview 3-2 of the geartrain 60 of FIG. 2 is a second embodiment of the off-axis mechanical connection 40. This embodiment of the off-axis mechanical connection 40 is preferably in the form of a spur gearset connection including a plurality of meshingly engaged gear elements. In this embodiment, the first rotating member 42 may be a spur gear that is coupled to the rotor 32 of the electric machine 30, and the second rotating member 46 may be a spur gear that is coupled to the pump hub 57 of the torque converter 50. First and second intermediate spur gears 47, 48, respectively, are disposed between the first and second rotating members 42, 46 and meshingly engaged therewith. The first and second rotating members 42, 46 and the first and second intermediate spur gears 47, 48 may be designed to have a suitable final gear ratio that permits a mechanical coupling that may be selected based upon torque, speed and power capabilities of the engine 10 and the electric machine 30.

The arrangement described herein enhances vehicle drivability by utilizing the torque converter 50. The arrangement described herein provides a reliable connection between the electric machine 30 and the geartrain 60. The electric machine 30 spins at a speed that is determined by the engine speed, thus permitting the electric machine 30 to operate as an alternator, and eliminating a need for a separate component to provide the functions of the electrical alternator in one embodiment. The electric machine 30 spins the hydraulic pump 68 that is configured to supply pressurized hydraulic fluid to the transmission gearbox 62, thus eliminating need for an auxiliary hydraulic pump and eliminating a need for an associated electric motor in one embodiment.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A geartrain for a powertrain system, wherein the geartrain is disposed to transfer mechanical power between an internal combustion engine, an electric machine and a driveline, the geartrain comprising:
   a flywheel, a torque converter, an off-axis mechanical connection, a disconnect clutch, and a transmission gearbox;
   wherein:
      the off-axis mechanical connection is disposed within a housing of the geartrain and includes a first element rotatably coupled to a second element;
      the torque converter includes a pump, a turbine and a pump hub,
      the flywheel is coupled to a crankshaft of the internal combustion engine and coupled to the pump of the torque converter,
      the transmission gearbox includes an input member,
      the pump hub is coupled to the first element of the off-axis mechanical connection,
      the second element of the off-axis mechanical connection is coupled to a rotor of the electric machine,
      the turbine of the torque converter is coupled to the input member of the transmission gearbox,
      the disconnect clutch is arranged to couple the pump of the torque converter and the pump hub, and
      the flywheel is coupled to the crankshaft of the internal combustion engine and is coupled to the pump of the torque converter via activation of the disconnect clutch.

2. The geartrain of claim 1, wherein the off-axis mechanical connection includes a spur gearset, wherein the first element comprises a first spur gear and the second element comprises a second spur gear, and wherein the first and second spur gears are rotatably coupled via meshingly engaged intermediate spur gears.

3. The geartrain of claim 1, wherein the off-axis mechanical connection includes a chain and sprocket gearset, wherein the first element comprises a first toothed gear and the second element comprises a second toothed gear, and wherein the first and second toothed gears are rotatably coupled via a chain.

4. The geartrain of claim 1, wherein the off-axis mechanical connection includes a belt and pulley arrangement, wherein the first element comprises a first pulley and the second element comprises a second pulley, and wherein the first and second pulleys are rotatably coupled via a belt.

5. The geartrain of claim 1, wherein a portion of the off-axis mechanical connection is immersed in lubricating fluid.

6. The geartrain of claim 1, further comprising the pump hub rotatably coupled to a hydraulic pump that is configured to supply pressurized hydraulic fluid to the transmission gearbox.

7. The geartrain of claim 1, wherein the disconnect clutch comprises one of a selectable mechanical diode or a friction clutch.

8. The geartrain of claim 1, wherein the electric machine is disposed to function as an alternator.

9. The geartrain of claim 1, further comprising the electric machine coupled to a hydraulic pump of the transmission gearbox and disposed to spin the hydraulic pump to supply pressurized hydraulic fluid thereto.

10. A powertrain system including an internal combustion engine and an electric machine disposed to transfer mechanical power to a driveline, the powertrain system comprising:
   the internal combustion engine including a crankshaft and a starter, the electric machine including a rotor, and a geartrain including a flywheel, a torque converter, an off-axis mechanical connection and a transmission gearbox;
   wherein the starter includes a starter gear that meshingly engages gear teeth that are disposed on an outer circumference of the flywheel;
   wherein the off-axis mechanical connection is disposed within a housing of the geartrain and includes a first element rotatably coupled to a second element;
   wherein the torque converter includes a pump, a turbine and a pump hub;
   wherein the flywheel is coupled to the crankshaft of the internal combustion engine;
   wherein a disconnect clutch is arranged to couple the pump of the torque converter and the pump hub;
   wherein the transmission gearbox includes an input member;
   wherein the pump hub is coupled to the first element of the off-axis mechanical connection;
   wherein the second element of the off-axis mechanical connection is coupled to the rotor of the electric machine; and
   wherein the turbine of the torque converter is coupled to the input member of the transmission gearbox.

11. The powertrain system of claim 10, wherein the off-axis mechanical connection includes a spur gearset, wherein the first element comprises a first spur gear and the second element comprises a second spur gear, and wherein the first and second spur gears are rotatably coupled via meshingly engaged intermediate spur gears.

12. The powertrain system of claim 10, wherein the off-axis mechanical connection includes a chain and sprocket gearset, wherein the first element comprises a first toothed gear and the second element comprises a second toothed gear, and wherein the first and second toothed gears are rotatably coupled via a chain.

13. The powertrain system of claim 10, wherein the off-axis mechanical connection includes belt and pulley arrangement, wherein the first element comprises a first pulley and the second element comprises a second pulley, and wherein the first and second pulleys are rotatably coupled via a belt.

14. The powertrain system of claim 10, further comprising the pump hub rotatably coupled to a hydraulic pump that is configured to supply pressurized hydraulic fluid to the transmission gearbox.

15. The powertrain system of claim 10, wherein the disconnect clutch comprises one of a selectable mechanical diode or a friction clutch.

16. The powertrain system of claim 10, further comprising the electric machine rotatably coupled to a hydraulic pump of the transmission gearbox and disposed to spin the hydraulic pump to supply pressurized hydraulic fluid to the transmission gearbox.

17. The powertrain system of claim 16, wherein the electric machine is rotatably coupled to the hydraulic pump via the off-axis mechanical connection, and wherein the off-axis mechanical connection comprises a chain drive.

18. The powertrain system of claim 10, wherein the transmission comprises one of an automatic transmission, a continuously variable transmission, and a dual-clutch transmission.

* * * * *